(12) United States Patent
Fickey

(10) Patent No.: US 7,826,933 B2
(45) Date of Patent: Nov. 2, 2010

(54) ADAPTIVE RELAYING CONTROLLED BY AUTONOMOUS EVENT DETECTION

(75) Inventor: Karl Fickey, Lake Milton, OH (US)

(73) Assignee: FirstEnergy Corp., Akron, OH (US)

( * ) Notice: Subject to any disclaimer, the term of this patent is extended or adjusted under 35 U.S.C. 154(b) by 635 days.

(21) Appl. No.: 11/593,391

(22) Filed: Nov. 6, 2006

(65) Prior Publication Data

US 2007/0109701 A1 May 17, 2007

Related U.S. Application Data

(60) Provisional application No. 60/734,003, filed on Nov. 4, 2005.

(51) Int. Cl.
*G05D 11/00* (2006.01)
*G01W 1/00* (2006.01)
*G01R 19/00* (2006.01)
*H02H 3/00* (2006.01)

(52) U.S. Cl. .................... 700/293; 700/286; 73/170.24; 702/3; 702/4; 324/72; 324/76.11; 361/65

(58) Field of Classification Search ................ 700/286, 700/287, 292, 293; 73/170, 24; 434/271; 702/3, 4; 324/72, 76.11; 361/62, 65
See application file for complete search history.

(56) References Cited

U.S. PATENT DOCUMENTS

| | | | | |
|---|---|---|---|---|
| 4,276,576 A * | 6/1981 | Uman et al. .................... 361/1 | | |
| 6,061,216 A | 5/2000 | Fuqua, III | | |
| 6,697,951 B1 * | 2/2004 | Sinha et al. ................. 713/300 | | |
| 6,707,655 B2 | 3/2004 | McElray, Sr. et al. | | |
| 6,778,370 B1 | 8/2004 | Laplace et al. | | |
| 6,952,648 B1 | 10/2005 | Menard et al. | | |
| 7,218,217 B2 * | 5/2007 | Adonailo et al. ............. 340/522 | | |
| 2001/0034568 A1 * | 10/2001 | Egolf et al. .................. 700/292 | | |
| 2002/0080540 A1 | 6/2002 | McElray, Sr. et al. | | |
| 2003/0004780 A1 | 1/2003 | Smith et al. | | |
| 2004/0105204 A1 | 6/2004 | McElray, Sr. et al. | | |
| 2005/0096856 A1 | 5/2005 | Lubkeman et al. | | |
| 2007/0135970 A1 * | 6/2007 | Zhou et al. ................... 700/286 | | |

OTHER PUBLICATIONS

Article from the Internet entitled "Agent Technology Applied to Adaptive Relay Setting for Multi-Terminal Lines" found on Nov. 14, 2005.
International Search Report, mailed Jun. 25, 2008, 3 pages.

* cited by examiner

*Primary Examiner*—Paul L Rodriguez
*Assistant Examiner*—Sheela Rao
(74) *Attorney, Agent, or Firm*—Brouse McDowell; Heather M. Barnes

(57) ABSTRACT

An adaptive relaying control system and method is disclosed for adapting coordination of protective measures provided to an electric-energy distribution system as a function of at least an ambient weather condition. A weather sensor senses the ambient weather condition within a region adjacent to at least a portion of the electric-energy distribution system. A control unit is operatively coupled to the weather sensor to receive a weather signal indicative of the ambient weather condition and determine whether a storm condition exists based at least in part on the weather signal. The control unit establishes a suitable control philosophy for adapting coordination of the protective measures provided to the electric-energy distribution system based at least in part on whether the storm condition exists.

10 Claims, 4 Drawing Sheets

ADAPTIVE RELAYING CONTROLLED BY AUTONOMOUS EVENT DETECTION

CROSS-REFERENCE TO RELATED APPLICATIONS

This application claims the benefit of U.S. Provisional Application No. 60/734,003, filed on Nov. 4, 2005.

BACKGROUND OF THE INVENTION

1. Field of the Invention

The present invention is directed generally to a method and apparatus for controlling the distribution of electric energy, and more specifically, to a method and apparatus for adapting coordination of protective measures provided to an electric-energy distribution system as a function of at least a sensed weather condition.

2. Description of Related Art

Traditionally, electric energy has been transmitted away from generation facilities to be distributed to residential, industrial and commercial structures by a network of conducting wires commonly referred to as power lines. The network of power lines forms a portion of what is commonly referred to as a power grid. The power grid also includes the upstream generation facilities and substations disposed electrically between the generation facilities and the end users of the electric energy. Electric energy is conducted between the generation facilities and the substations by the power lines, which also distribute the electric energy from the substations to the various types of structures.

Electric energy, also commonly referred to as electricity, is produced at the generation facilities at relatively low voltages and then has its voltage stepped up by the power station transformer to high transmission voltages. High transmission voltages are often several hundred kilovolts, usually topping out at about 765 kV to conduct electric energy over long transmission distances. The high transmission voltages are necessary to minimize losses due to the impedance of the power lines as those lines conduct the electric energy over long distances to substations. At the substations, the high voltages are stepped back down to a suitable level, usually between 2.4 kV and 33 kV, for transmitting the electric energy the remaining, relatively short distances over a distribution grid to the various structures occupied by the end users of the electricity. Distribution transformers provided near the structures of the end users perform the final voltage step down to deliver the desired voltage to the end users, and this finally-stepped-down electric energy is then conducted by consumer lines to the structures occupied by the end users.

In the power grid described above, the generation facilities are considered to be "upstream," meaning that they act as the source from which the electric energy flows. Likewise, the electric energy flows "downstream" from the generation facilities to the substations, and eventually, on to the end users. One, or a relatively small number of high-voltage transmission lines can conduct the high-voltage electric energy downstream from a generation facility to a substation. At each substation a larger number of distribution lines carrying electric energy at a voltage that is lower than the electric energy carried by the high-voltage transmission lines branch off from the high-voltage transmission line. The distribution lines can run parallel to public roadways and conduct electric energy from the substations to the various structures such as residential homes. A service line then conducts electric energy at a voltage suitable for each particular structure from a distribution line to the structure, and there can be many structures that receive electric energy from a given distribution line. Thus, many distribution lines can branch out from a small number of high-voltage transmission lines at a substation, and a large number of service lines can branch off of each distribution line at structures occupied by the end users of the electric energy.

An electric utility supplying electricity to a region divides the power grid into zones to minimize the effect of a fault condition on the power grid as a whole. Each zone is separated from others by one or more primary electrical isolation devices such as feeder breakers that are located at a substation and are designed to isolate a zone in which a fault condition has occurred. For example, a feeder breaker can disconnect an entire distribution line from the power grid, thereby disrupting the flow of electricity to that distribution line. Accordingly, all structures that are supplied with electricity from that distribution line will experience a loss of electricity until it is determined that the detected fault condition no longer exists.

Additionally, secondary isolation devices such as fuses are distributed within each zone throughout the power grid to further isolate a fault condition. By isolating the fault to a particular zone, or even to a particular portion of the zone, the number of structures to which the delivery of electricity is interrupted is minimized.

Previous systems for controlling the interaction of protective measures provided to the power grid have attempted to minimize the number of structures that lose electricity service while still isolating the fault condition. Such conventional power grid protection systems, however, have their shortcomings. One conventional protection system employs a fuse blowing philosophy. According to such a philosophy, the substation feeder breaker is properly coordinated with the downstream fuses. In the event of a fault condition, a fuse will clear any downstream fault within its rating instead of the feeder breaker.

The fuse blowing philosophy is effective in isolating the fault condition while minimizing the number of electricity customers that lose electric service. Structures upstream of the blown fuse and serviced by the distribution line will not experience a disruption of electricity service. However, the problem with this philosophy is that the electricity service to customers fed by the distribution line and located downstream of the fuse that is blown is permanently interrupted, even if the fault condition is only a temporary fault. Further, the electricity service remains interrupted until the utility servicing that distribution line can manually replace the blown fuse, an expensive and time consuming process, particularly if there are widespread reports of blown fuses.

Other conventional power grid protection systems have employed a fuse saving philosophy. According to this philosophy, the first trip of the substation feeder breaker is intentionally miscoordinated so that the breaker operates faster than the fuse to clear a fault downstream of the fuse. The speed with which the first trip of the feeder breaker occurs prevents the fuse from blowing, and following a short delay, the feeder breaker is reset. If the fault condition is still present when the breaker feeder is reset, any further trips of the feeder breaker will be intentionally is slower than operation of the fuse so that the fault condition is isolated when the fuse blows. However, the fuse saving philosophy causes all customers serviced by the distribution line protected by the feeder breaker experience a momentary interruption for all faults, instead of just the customers downstream of the fuse.

Both the fuse blowing and the fuse saving philosophies are rigid, operating under the same principles regardless of the condition that could possibly have caused the fault condition. The fuse blowing system always results in a permanent interruption of electricity service upon the detection of a fault condition, even if that fault condition is temporary. And although the fuse saving system can minimize permanent interruptions of electricity service due to temporary faults, it always results in at least a brief interruption of electricity service to all customers serviced by the entire distribution line protected by the feeder breaker. Neither system takes into consideration the circumstances possibly leading to the fault condition to optimize performance of the power grid under different conditions.

Accordingly, there is a need in the art for a power grid protection system and method that protects the power grid based at least in part on a possible cause of a fault condition. The system and method can offer protection of the power grid automatically and without operator intervention based at least in part on a sensed weather condition. Further, the system and method can optionally allow for manual selection of the power grid's protection.

BRIEF SUMMARY OF THE INVENTION

According to one aspect, the present invention provides a method of adapting coordination of protective measures provided to an electric-energy distribution system as a function of at least an ambient weather condition. The method includes the steps of sensing the ambient weather condition within a region adjacent to at least a portion of the electric-energy distribution system, and communicating a signal indicative of the ambient weather condition to a control unit for determining whether a storm condition exists based at least in part on the ambient weather condition. The method further includes establishing a suitable control philosophy for adapting coordination of the protective measures provided to the electric-energy distribution system based at least in part on whether a storm condition exists as determined by the control unit.

According to another aspect, the present invention provides an adaptive relaying control system for adapting coordination of protective measures provided to an electric-energy distribution system as a function of at least an ambient weather condition. A weather sensor senses the ambient weather condition within a region adjacent to at least a portion of the electric-energy distribution system. A control unit is operatively coupled to the weather sensor to receive a weather signal indicative of the ambient weather condition and determine whether a storm condition exists based at least in part on the weather signal. The control unit establishes a suitable control philosophy for adapting coordination of the protective measures provided to the electric-energy distribution system based at least in part on whether the storm condition exists.

According to another aspect, the present invention provides an electric energy distribution system for supplying end-user structures with electric energy. The distribution system includes a generation facility for generating electric energy to be transmitted to end-user structures, a power grid comprising a network of high-voltage transmission lines and a network of distribution lines, and a substation for stepping down a voltage of electric energy transmitted over the high-voltage transmission lines to a moderate distribution voltage to be transmitted over the distribution lines. A first circuit interrupter is provided to the substation for selectively separating a region of end-user structures from the power grid upon the occurrence of a fault condition in said region. A plurality of second circuit interrupters are each provided downstream from the first circuit interrupter to separate a portion of the region from the power grid upon the occurrence of the fault condition in that portion of the region. A weather sensor sense the ambient weather condition within a region adjacent to at least a portion of the electric-energy distribution system, and a control unit that is operatively coupled to the weather sensor receives a weather signal indicative of the ambient weather condition and determines whether a storm condition exists based at least in part on said weather signal. The control unit establishes a suitable control philosophy for adapting coordination of the first circuit interrupter with the second interrupters provided to the electric-energy distribution system based at least in part on whether the storm condition exists.

BRIEF DESCRIPTION OF THE DRAWINGS

The invention may take physical form in certain parts and arrangement of parts, embodiments of which will be described in detail in this specification and illustrated in the accompanying drawings which form a part hereof, and wherein.

DETAILED DESCRIPTION OF ILLUSTRATIVE EMBODIMENTS

Figure 1:
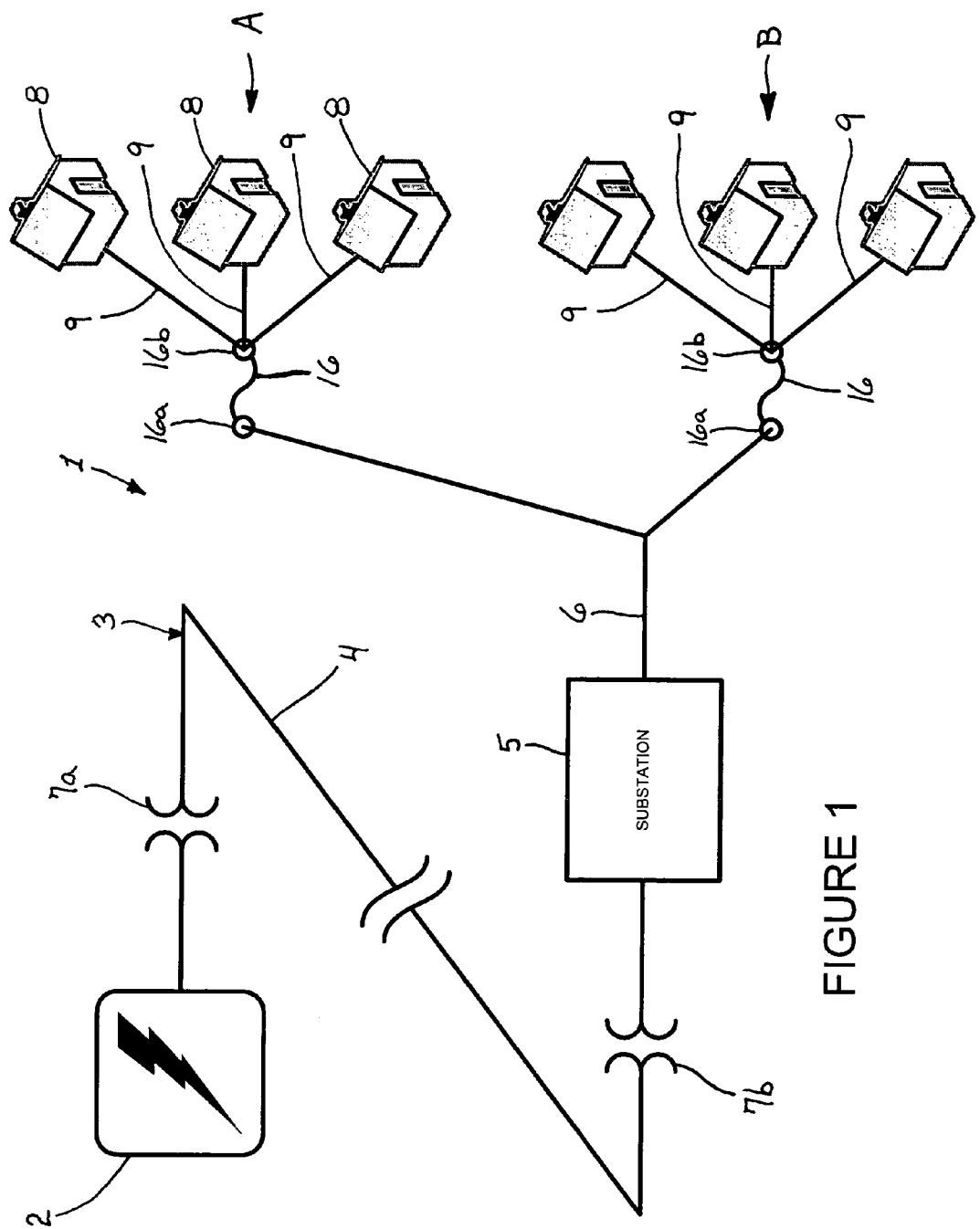
FIG. 1 is a schematic illustration of a portion of a power grid.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

FIG. 1 schematically depicts a typical arrangement of an electric-energy distribution system 1. A generation facility 2 generates electric energy to be distributed to end users with a turbine, nuclear reactor, hydroelectric generator, or any other system for electric energy generation. As the generation facility 2 is the source of the electric energy, it is considered to be the furthermost "upstream" component of the distribution system 1. Based on the position that electric energy is conducted from the generation facility 2 to end users via a power grid 3, features such as a substation 5, transformers 7a, 7b, etc. . . . encountered by the electric energy as it advances toward the end users are considered "downstream" of the generation facility 2.

Likewise, these downstream features can be considered upstream and downstream relative to each other based on their relative positions within the distribution system 1 electrically between the generation facility 2 and the end users in an analogous manner. For example, the substation 5 is considered downstream of the transformer 7a because the substation 5 is further along the conductive path away from the generation facility 2 towards the end users than is the transformer 7a.

Transformer 7a steps up the voltage of the electric energy to a high transmission voltage to minimize voltage losses to the electric energy as it is conducted via the power grid 3 from the generation facility 2 to structures 8 occupied by the end users. The high transmission voltage is chosen according to sound engineering judgment to achieve a desired minimal voltage loss for the distance the electric energy is to be transmitted. As a rule of thumb, however, the longer the distance the electric energy is to be transmitted, the higher the transmission voltage. Depending on the circumstances and the particular destination of the electric energy, the transmission voltages can even approach voltage levels up to, and at times exceeding 765 kV.

The power grid 3 is a network of conducting wires, also referred to as lines, over which the electric energy is conducted between the generation facility 2 and the end-user structures 8. The lines vary in their composition, number of conducting strands and size based at least in part on the voltage and electric current they are to conduct. For example, a high-voltage transmission line 4 can include a large multi-stranded aluminum conductor to conduct electric energy at high transmission voltages. The high transmission voltages are stepped down by a substation transformer 7b. Although the substation transformer 7b is shown separate from the substation 5, it is common for the substation transformer 7b to be included as part of the substation 5.

Similarly, a distribution line 6 from which many of the end-user structures 8 branch using consumer lines 9 may only conduct electric energy having mid-range voltages falling in a range of about 2.4 kV to about 33 kV, for example. One or more distribution lines 6 are removably connected to the power grid 3 by a feeder breaker 12 (FIG. 2) provided to the substation 5. A single distribution line 6 is shown extending from the substation 5 in FIG. 1, however it is to be noted that more than one distribution line 6 can, and likely is supplied with electric energy having a mid-range voltage from each substation 5. Further, each distribution line 6 can be branched as desired and according to sound engineering judgment to optimize distribution of the electric energy. The mid-range voltages of the electric energy are further stepped down to deliverable voltage levels by a distribution transformer (not shown) located adjacent to the end-user structures 8. Depending on the location of the end-user structures 8, their demands for electric energy, and other such factors known in the art, the deliverable voltage levels are typically at least about 110 V, and can be any desired value, typically up to and above about 220 V for residential end users. Of course industrial structures, commercial structures and the like can be supplied with electric energy having any desired voltage level from the distribution transformer.

Protective measures are provided to the power grid to isolate a fault condition and minimize the effect of said fault condition on the power grid as a whole. FIG. 1 illustrates a simplified representation of the distribution system 1 for the sake of brevity and clearly describing the present invention. Only a single high-voltage transmission line 4 supplying electric energy to a single substation 5 is shown, however, it is understood that the distribution system 1 actually includes a power grid 3 formed from a network of many high-voltage transmission lines 4, substations 5, distribution lines 6, and consumer lines 9. The vast distribution system 1 is typically divided into zones by the protective measures for isolating a fault condition should such a condition occur, and for minimizing damage to the remainder of the distribution system 1 and the number of end users that experience any loss of electric service.

One such protective measure is a fuse 16, switch or other such protective measure located downstream of the substation 5 that can create an open circuit condition in response to a fault condition. When the fault condition, such as a short circuit formed between two adjacent conductors of electric energy, a voltage spike, inrush of current, and the like, occurs, a rated electrical parameter of the fuse 16 or other such protective measure is exceeded, causing the fuse 16 or other protective measure to create an open circuit. The open circuit effectively cuts the portion of the distribution system 1 downstream from the open circuit off from the portion of the distribution system 1 upstream from the open circuit, which also includes the substation 5.

Consider an instance where a fault condition at one of the end-user structures 8 in Group A attempts to draw an excessive amount of current through the fuse 16 in FIG. 1, for example. If the fault condition persists for a predetermined period of time, the fuse 16 will blow, meaning that a current greater than the fuse's rated current causes a portion of the fuse 16 to melt away or otherwise disintegrate. The melting of that portion of the fuse 16 results in the formation of a gap between opposite ends 16a, 16b of the fuse 16 that were once separated by the now-melted portion of the fuse 16 for Group A. This gap effectively separates the portion of the distribution system 1 downstream from the fuse 16 (i.e., Group A) from the portion of the distribution system 1 upstream from the fuse 16, wherein said upstream portion includes the substation 5. The flow of electric energy to the Group A end-user structures is interrupted until such time when the fuse 16 or other protective measure can be replaced or otherwise manually reset. However, the effect of the fault condition is isolated downstream of the fuse 16. The flow of electric energy to another set of end-user structures 8 (i.e., Group B) branching off of the distribution line 6 upstream from the fuse 16 that is blown is maintained, although an initial flicker may be detected by those Group B end users. The fuses 16 or other protective measure downstream from the substation 5 will be collectively referred to hereinafter as a fuse 16, although other types of circuit interrupters are also contemplated by the present invention.

The flow of electric energy to the end user structures 8 downstream from the blown fuse 16 does not resume until the fuse 16 is replaced or otherwise reset. Thus, the fuse 16 is a permanent disruption type of circuit interrupter that remains open until it is replaced, reset, serviced, or otherwise tended to.

Figure 2:
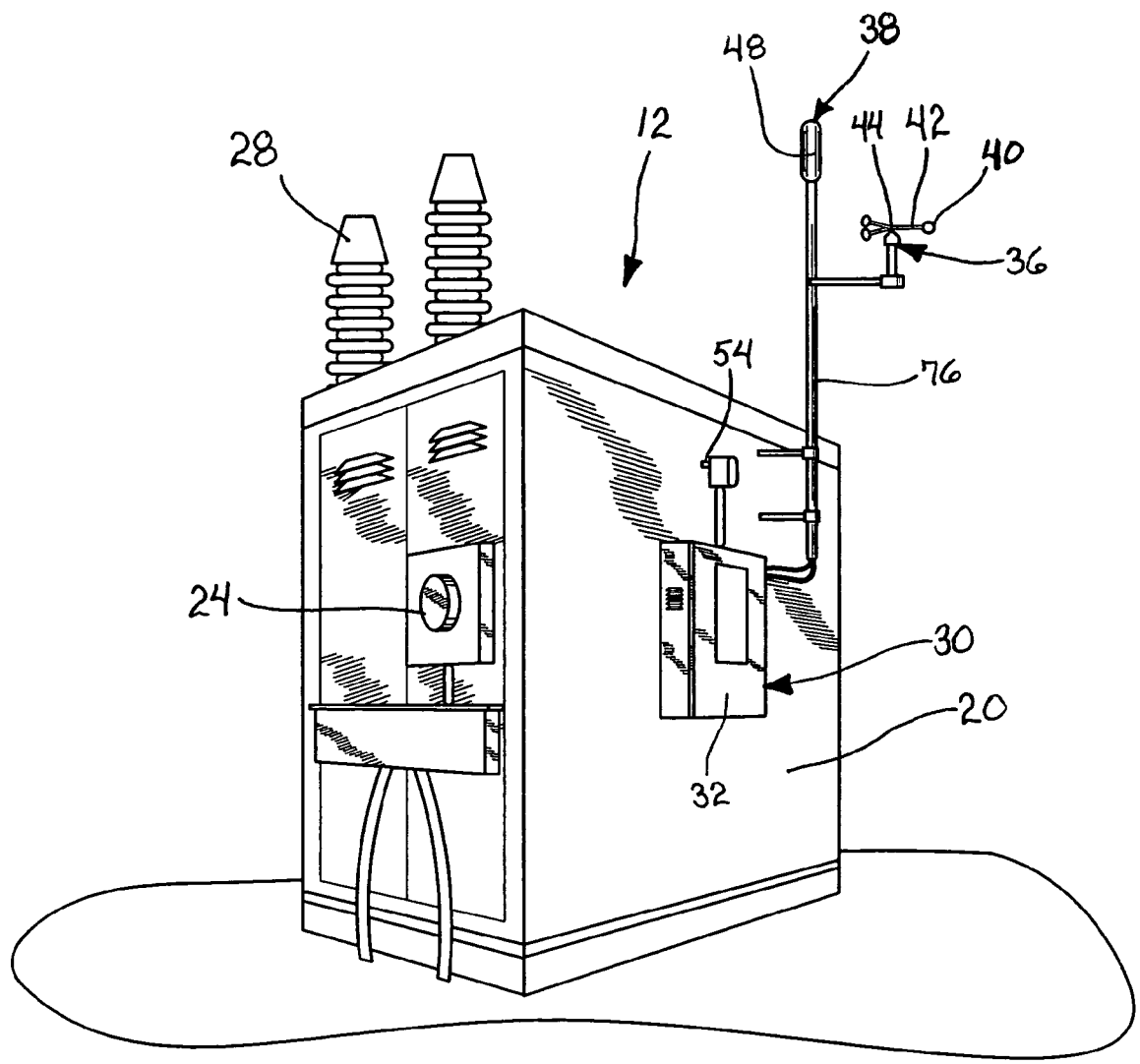
FIG. 2 is a perspective view of a substation feeder breaker including an adaptive relaying system in accordance with an embodiment of the present invention.

In addition to the fuse 16, a feeder breaker 12 or other type of high-voltage circuit interrupter (hereinafter collectively referred to as the feeder breaker 12), shown best in FIG. 2, is provided upstream from the fuse 16, optionally at the substation 5. For embodiments where the feeder breaker 12 is located at the substation, such as that shown in FIG. 1, the feeder breaker 12 selectively connects and disconnects the distribution line 6 from the substation 5 as well as the portion of the distribution system 1 upstream from the substation 5. There are a plurality of fuses 16 downstream from the feeder breaker 12, wherein each fuse 16 separates one or more branches of the distribution line 16 from the distribution line 6 itself. Thus, each fuse 16 separates a portion, but less than all of the end-user structures 8 that receive electric energy over a consumer line 9 in electrical communication with the distribution line 6. Accordingly, each fuse 16, if blown, can isolate a portion of the electric service provided by the distribution line 6. The feeder breaker 12, on the other hand, is upstream of the fuses 16 and can isolate the entire distribution line 6, including all end-user structures 8 receiving electric energy there from, from the distribution system 1. The feeder breaker 12 can also optionally be reset to reestablish the flow of electric energy from the substation 5 to the distribution line 6, and can optionally be a temporary circuit interrupter. A temporary circuit interrupter is a switch that can be automatically reset without user intervention after a predetermined period of time has lapsed following the occurrence of an initial fault condition. If the fault condition remains when the switch is reset, the temporary circuit interrupter again interrupts the downstream flow of electric energy. However, this time, the switch remains open until the fault condition can be cleared and the switch manually reset.

FIG. 2 is a perspective view of a feeder breaker 12 provided to a substation 5 and enclosed within a metallic housing 20. The housing 20 encloses a suitably-robust switch chosen with sound engineering judgment for interrupting a circuit conducting electric energy with voltage and current levels conducted by that particular substation 5. Further, the switch can optionally include snubber circuits or other interrupting features that allow the switch to interrupt the flow of electric energy regardless of the type of load attached thereto. The feeder breaker 12 can also include a meter 24, electrical contacts 28 and other suitable components for interrupting the flow of electric energy from the substation 5 to the distribution line 6 as is known in the art.

An adaptive relaying system 30 is also visible on the exterior of the feeder breaker's housing 20. The adaptive relaying system 30 includes a control unit 32 operatively coupled to receive a signal indicating the presence of an ambient weather condition as detected by at least one sensor for detecting said ambient weather condition. The adaptive relaying system 30 protects the distribution system 1 based at least in part on the signal indicating the presence of the ambient weather condition.

The adaptive relaying system 30 includes one or both of a wind speed sensor 36 and a lightning detector 38, which is also commonly referred to as an electrostatic discharge detector. The wind speed sensor 36, also referred to herein as an anemometer, includes a plurality of wind-catching cups 40, each supported by an arm 42 extending outwardly from a central hub 44. According to an embodiment of the present invention, three cups 40 are coupled to the hub 44, which is directly coupled to a slotted disc chopper wheel (not shown) that is disposed internally of the anemometer 36. As the chopper wheel rotates, it interrupts the light path of an optical link, generating a pulsed frequency output signal that is proportional to the speed of the wind causing rotation of the cups 40. The pulsed output signal can optionally be amplified and received by a dedicated wind-speed translator module that converts the discrete pulsed output signal into analog voltage, current, or both voltage and current output signals. Alternately, the pulsed output signal from the anemometer 36 can be input to a digital counter, programmable logic controller ("PLC"), totalizer, any other signal processor such as a microprocessor-based control system, or any combination thereof. An example of a suitable wind-speed sensor 36 is the Model 010C Wind Speed Sensor, offered by Met One Instruments, Inc. Such wind-speed sensors 36 are well adapted for use in a variety of weather conditions, from sub-arctic cold temperatures to arid desert temperatures.

Although the wind-speed sensor 36 is described above as utilizing a chopper wheel to interrupt a path of light to generate signal, other embodiments of the present invention can generate other types of signals indicative of wind speed. Such signals can be digital or analog, and can be any signal that can convey information about wind speed in the environment of the wind-speed sensor 36.

The lightning detector 38 includes an antenna 48 extending upwardly above the housing 20 of the feeder breaker 12 to detect the presence of an electromagnetic discharge, which is present with each lightning strike. The antenna 48 can be chosen as appropriate to detect the presence of electromagnetic discharge within a desired range. According to embodiments of the present invention, the antenna chosen can detect electromagnetic discharge within a 25 mile radius of the antenna 48, however, other larger and smaller ranges are also within the scope of the present invention.

The antenna 48 is operatively coupled to a receiver 50 (FIG. 3) that includes electronic hardware and software required to process the signal generated by the antenna 48 in response to the presence of electromagnetic discharge. The signal emitted by the antenna 48 can indicate a general direction of each lightning strike, and a strength of the signal from the antenna 48 can be interpreted according to the software functions of the receiver 50 to provide an approximate distance of each strike from the antenna 48. An example of a suitable receiver 50 for use with the present invention is the LD-250 Lightning Detector offered by Boltek Corporation. The LD-250 Lightning Detector uses a small active antenna 48 to receive radio signals generated by lightning strikes. The direction-finding antenna 48 is able to tell which direction the signal is coming from, and the strength of the signal is used by software embedded in the LD-250 to estimate the distance of each lightning strike.

The control unit 32 can be coupled to an exterior of the housing 20 of the feeder breaker 12, as shown in FIG. 2. For such embodiments, the adaptive relaying system 30 is operatively connected to the feeder breaker 12 by an interface 54 that extends through the housing 20. Control signals generate by the control unit 32 for governing the opening and closing of the feeder breaker 12 as discussed in detail below are fed to the feeder breaker 12 via the interface 54.

Figure 3:
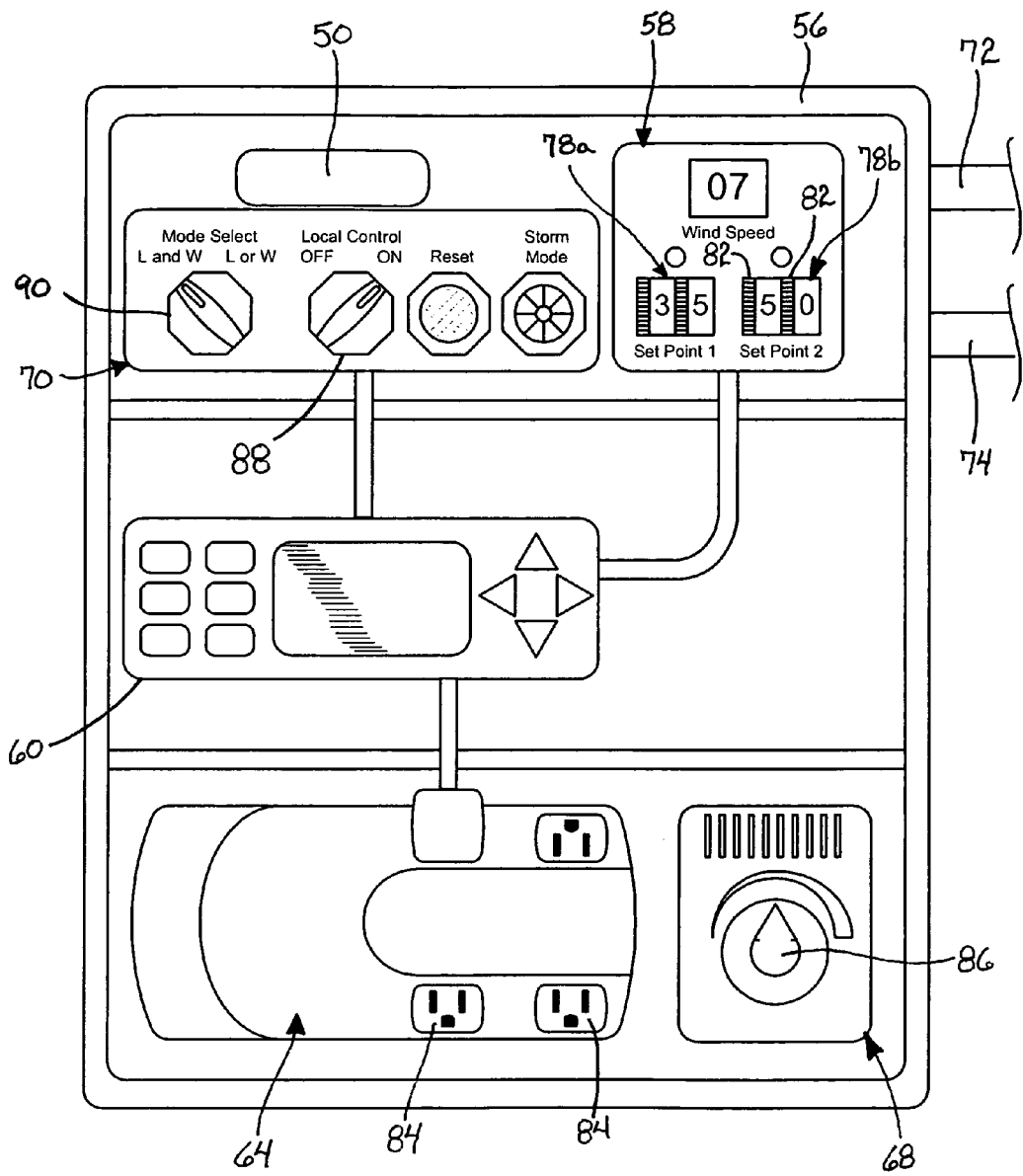
FIG. 3 is a front view of an illustrative arrangement of a control unit of an adaptive relaying system in accordance with an embodiment of the present invention.

FIG. 3 depicts an illustrative arrangement of an interior of the control unit 32 of the adaptive relaying system 30 in accordance with an embodiment of the present invention. The control unit 32 includes a housing 56 that encloses the receiver 50 of the lightning detector 38, a wind-speed controller 58 and a programmable logic controller ("PLC") 60. An uninterruptible power supply ("UPS") 64 and heater 68 can optionally also be included within the housing 56. A user interface 70 can optionally be disposed within the housing 56, or exposed to an exterior of the control unit 32 to permit an operator to adjust the settings of the adaptive relaying system 30 without gaining access to the interior of the housing 56.

As mentioned above, the receiver 50 is operatively coupled to the antenna 48 of the lightning detector 38 by an electrical conductor 72. Each signal generated by the antenna 48 in response to lightning strike is communicated to the receiver 50. This signal conveys information regarding the direction of the lightning strike relative to the antenna 48, and the strength of the signal is indicative of the proximity of the lightning strike relative to the antenna 48. The receiver 50 transmits a lightning signal to the PLC 60, which, depending on the mode of operation selected via the user interface 70 as described below, can adapt coordination of the protective measures provided to the distribution system 1 based at least in part on the lightning signal.

Similar to the receiver 50, the wind-speed controller 58 is operatively coupled to the wind-speed sensor 36 by another electrical conductor 74. Both electrical conductors 72, 74 can be fed through a hollow tube 76 (FIG. 2) that supports the wind-speed sensor 36 and the lightning detector 38 to reach the control unit 32. A pair of threshold wind speed inputs 78a, 78b can be utilized by the operator to define a range of wind speeds that, if detected by the wind-speed sensor 36, would give rise to a presumption that any detected fault condition will be temporary. The presumption that any detected fault conditions will be temporary corresponds to what is referred to herein as a storm condition. Each of the wind speed inputs 78a, 78b can include a pair of thumb wheels 82 for adjusting each digit of the two-digit wind speed inputs 78a, 78b. Other embodiments can include a numeric keypad for both wind speed inputs 78a, 78b, a touch screen, or any other type of data input device. But regardless of the type of inputs 78a, 78b, each threshold wind speed, low and high, can be independently set by an operator to any value within the range of about 00 to 99 miles per hour ("mph"), inclusive, via the inputs 78a, 78b as discussed below. In this manner, the low and high threshold wind speed can be adjusted to properly reflect the conditions in a variety of different geographic regions.

A wind speed entered into the lower limit input 78a establishes a low threshold wind speed. If an actual wind speed detected by the wind-speed sensor 36 exceeds the low threshold wind speed, which is set to 35 mph in FIG. 3, a storm condition is initially considered to exist. Likewise, a wind speed entered into the upper limit input 78b establishes a high threshold wind speed. If an actual wind speed detected by the wind-speed sensor 36 exceeds the high threshold wind speed, which is set to 50 mph in FIG. 3, the storm condition is no longer considered to exist. Typically, fault conditions that result from excessive wind speeds are permanent in nature, not temporary. Thus, a storm condition exists when the actual wind speed measured by the wind-speed sensor 36 falls within the range of wind speeds defined by the wind speeds entered into the upper and lower limit inputs 78a, 78b. If the event a storm condition exists, the wind-speed controller 58 emits a wind signal that is communicated to the PLC 60. The PLC 60, depending on the mode of operation selected via the user interface 70 as described below, can adapt coordination of the protective measures provided to the distribution system 1 based at least in part on the wind signal.

The optional UPS 64 converts stored electric energy into a form that can be utilized to maintain operation of the control unit 32 in the event that primary electric energy service thereto is interrupted. As shown in FIG. 3, the UPS 64 includes a battery (not shown) for supplying direct current ("DC") electric energy that is converted to alternating current ("AC") by an inverter (not shown). Four standard AC plug outlets 84 are available to plug any one or more of the PLC 60, wind-speed controller 58, receiver 50, user interface 70 and heater 68. It is to be noted that the present invention is not limited to a four outlet AC UPS 64. The UPS 64 can have any number of outlets 84, and can source any DC, AC, or a combination of DC and AC electric energy in the event that primary electric energy service is interrupted.

The heater 68 can optionally be disposed within the control unit 32 to minimize damage to the electric and electronic components therein as a result of cold temperatures. The heater 68 can be any type of thermal-energy producing device, such as a resistive element heater, for example, and can optionally include a thermostat 86 to allow selection of a desired minimum temperature to be maintained within the housing 56. However, alternate embodiments of the present invention include a control panel 32 disposed internally of the feeder breaker's housing 20. According to such embodiments, the temperature within the housing 20 may be sufficient to eliminate the need for the heater 68 altogether.

The PLC 60 is a microprocessor-based industrial control system. It communicates with other control components, such as the receiver 50, user interface 70 and wind-speed controller 58 through data links. The PLC 60 can optionally include a non-volatile, computer accessible memory (not shown) for storing computer-executable instructions. The computer-executable instructions dictate how the PLC 60 adapts operation of protective measures provided to the distribution system 1 as a function of the at least one sensed weather condition. The PLC 60 is used for switching tasks and data manipulation, arithmetic operations, timing and process control.

Figure 4:
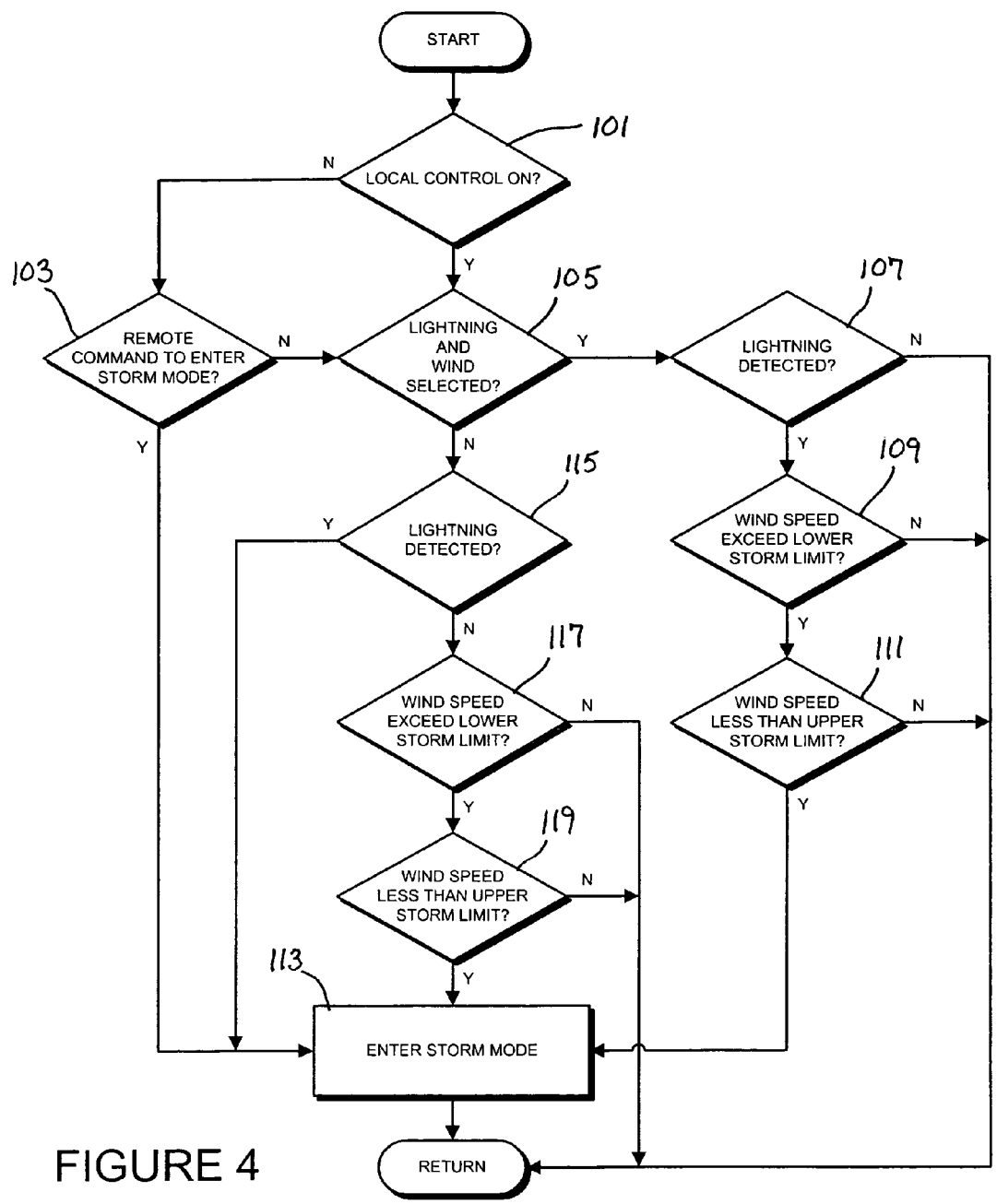
FIG. 4 is a flow diagram schematically depicting an illustrative flow of an adaptive relaying control method in accordance with an embodiment of the present invention.

A method of controlling the operation of the protective measures provided to the distribution system 1 with the PLC 60 according to the present invention is illustrated schematically by the flow diagram in FIG. 4. The adaptive relaying system 30 is operated in either a storm mode state when a lightning storm condition is determined to exist, a wind storm condition is determined to exist, or both; and a default mode when it is determined that neither the lightning nor the wind storm conditions exist.

In the storm mode, the adaptive relaying system 30 causes the protective measures to interact according to a fuse 16 saving philosophy to minimize the number of permanent interruptions of electric energy service in response to temporary fault conditions. According to the fuse saving philosophy, a first trip of the substation's feeder breaker 12 in response to a detected fault condition is miscoordinated so that the feeder breaker 12 operates faster than the fuse 16 to clear a fault downstream of the fuse 16. The speed with which the first trip of the feeder breaker 12 occurs prevents the fuse 16 from blowing, and following a short delay, the feeder breaker 12 is reset to automatically restore the electric energy service without operator intervention. If the fault condition is still present when the feeder breaker 12 is reset, any further trips of the feeder breaker 12 will be delayed so that the fault condition is isolated when the fuse 16 blows. Thus, if the fault condition is only temporary, then the brief interruption of electric energy service by the feeder breaker 12 resolves the fault condition without permanently disrupting the electric energy service.

In the default mode, the adaptive relaying system 30 causes the protective measures to interact according to a fuse 16 blowing philosophy. According to such a philosophy, the feeder breaker 12 is properly coordinated with the downstream fuses 16. In the event of a fault condition, a fuse 16 will isolate any downstream fault condition that exceeds the fuse's rating instead of the feeder breaker 12.

When the adaptive relaying system 30 operates in the storm mode, it is presumed that the ambient weather conditions are more likely to cause temporary fault conditions than permanent fault conditions. This is the reason for the preference in the storm mode to attempt a temporary interruption of electric energy service with the feeder breaker 12 as opposed to permanent interruptions by allowing the fuses 16 to blow. On the contrary, when operating in the default mode, the adaptive relaying system 30 exhibits a preference to isolate all faults by allowing the fuses 16 to blow rather than interrupting electric energy service with the feeder breaker 12. The basis for this preference in the default mode is that the ambient weather conditions are such that permanent interruptions of electric energy service are more likely than temporary interruptions.

Referring now to FIG. 4, an embodiment of a method according to the present invention commences by determining whether local control of the adaptive relaying system 30 has been established at step 101. The adaptive relaying system 30 of the present invention can be networked over a wide area or local area network to permit remote control of the adaptive relaying system 30. To activate remote control of the adaptive relaying system 30, an operator can manually adjust switch 88 (FIG. 3) on the user interface 70 to the OFF position, thereby terminating local control of the adaptive relaying system 30. With remote control of the adaptive relaying system 30 activated, a remotely-located dispatcher can manually toggle the adaptive relaying system 30 between storm and default mode at step 103. The dispatcher can also select the operational mode of the adaptive relaying system 30 as described below. Additionally, the adaptive relaying system 30 can be networked with other adaptive relaying systems to share information relating to ambient weather conditions in neighboring areas.

If at step 101 it is determined that local control is activated, then the operational mode of the adaptive relaying system 30 is determined at step 105. Operation of the protective measures provided to the distribution system 1 can be adapted as a function of at least one sensed weather condition. The sensed weather condition can be wind speed, the presence of lightning, or a combination of wind speed and lightning. Like the local control, the operational mode can be selected with a switch 90 provided to the user interface 70. With the switch 90 in the position shown in FIG. 3, i.e., lightning and wind, a threshold condition in each category must be achieved in order to cause the adaptive relaying system 30 to enter the storm mode. This operational mode of the adaptive relaying system 30 is referred to herein as the AND mode.

In the AND mode, the method progresses to determine whether lightning has been detected by the lightning detector 38 at step 107. To answer this decision in the affirmative, the lightning detector 38 must detect a predetermined number of lightning strikes within a known distance from the lightning detector 38 during a given time period, a predetermined frequency of lightning strikes, a combination thereof, or any other feature indicative of the onset of an approaching storm. Although it the check for lightning is shown first at step 107 in FIG. 4, alternate embodiments can check the wind condition first.

If lightning is not detected at step 107, the method can start over again since both lightning and wind have to be detected, and have to exceed the threshold limits. If either lightning or wind are absent while the adaptive relaying system 30 is in the AND mode, then it will not enter storm mode.

If lightning is sufficiently detected at step 107, then it must be determined at step 109 whether actual wind speeds measured by the wind-speed sensor 36 exceed the low threshold wind speed set with wind speed input 78a. If not, then again the method can start over since the adaptive relaying system 30 is operating in the AND mode. If, on the other hand the decision at step 109 is answered in the affirmative, then it must be determined whether the actual wind speed measured by the wind-speed sensor 36 exceeds the high threshold wind speed set with wind speed input 78b at step 111. If so, then a permanent fault condition is more likely to occur than a temporary fault because of the high wind speeds present in the ambient environment of the wind-speed sensor 36, and the method should remain in the default mode and start over. But if the actual wind speed measured by the wind-speed sensor 36 falls between the low and high threshold wind speeds, then the adaptive relaying system 30 enters the storm mode at step 113 and the method returns to the start.

Returning to the operational mode decision step 105, if it is determined that the switch 90 is adjusted to the "L or W" setting in FIG. 3, then only one of lightning or wind conditions need be satisfied to cause the adaptive relaying system 30 to enter the storm mode. This mode of operation is referred to herein as the OR mode.

Similar to the analysis in the AND mode, the method advances to step 115 to determine whether the lightning condition is satisfied. If a suitable number of lightning strikes are detected, then the storm mode is entered and it is irrelevant whether the wind conditions are satisfied. However, if no lightning is detected at step 115, then it must be determined at step 117 whether the actual wind speeds exceed the low threshold wind speed set by wind speed input 78a. Again, if it this condition is not satisfied at step 117, then the method can restart since neither the lightning nor wind conditions have been established. But if the low threshold wind speed has been exceeded by the actual wind speed, it must be determined at step 119 whether the actual wind speed is so high that permanent fault conditions are more likely than temporary faults. This is determined by comparing the actual wind speed to the high threshold wind speed set with wind speed input 78b. If the actual wind speed is less than the high threshold wind speed then the decision at step 119 is answered in the affirmative and the adaptive relaying system 30 enters the storm mode at step 113. But if the actual wind speed is greater than the high threshold wind speed as determined at step 119, then the adaptive relaying system 30 is operated in the default mode and the method restarts.

The flow diagram depicted herein is provided merely as an example to clearly and concisely describe an embodiment of a method within the scope of the present invention. It will be recognized by those skilled in the art that the steps described with reference to FIG. 4 are exemplary in nature. Some steps may be skipped or modified, new steps may be added, existing steps may be deleted, or the order of steps may be altered from that shown in the flow diagram without departing from the scope of the present invention.

Illustrative embodiments have been described, hereinabove. It will be apparent to those skilled in the art that the above devices and methods may incorporate changes and modifications without departing from the general scope of this invention. It is intended to include all such modifications and alterations in so far as they come within the scope of the appended claims.

What is claimed is:

1. A method of adapting coordination of protective measures provided to an electric-energy distribution system as a function of at least an ambient weather condition, the method comprising the steps of:

substantially, in substantially real-time, the ambient weather condition within a region adjacent to at least a portion of the electric-energy distribution system, wherein the electric-energy distribution system supplies electric energy to a plurality of end-user structures;

communicating a signal indicative of the ambient weather condition to a control unit for determining whether a storm condition exists based at least in part on the ambient weather condition;

establishing a control philosophy for autonomously adapting coordination of the protective measures provided to the electric-energy distribution system based at least in part on whether a storm condition exists as determined by the control unit, wherein a fuse saving philosophy is autonomously established when the storm condition is determined to exist and a fuse blowing philosophy is autonomously established when the storm condition is determined not to exist.

2. The method according to claim 1, wherein the step of sensing the ambient weather condition comprises the step of sensing an actual wind speed with an anemometer.

3. The method according to claim 2, wherein the control unit determines that the storm condition exists when the actual wind speed is greater than or equal to a low threshold wind speed and less than or equal to a high threshold wind speed.

4. The method according to claim 3, wherein the low threshold wind speed is about 35 mph and the high threshold wind speed is about 50 mph.

5. The method according to claim 1, wherein the step of sensing the ambient weather condition comprises the step of sensing a lightning strike with a lightning detector.

6. The method according to claim 5, wherein the control unit determines that the storm condition exists when a predetermined number of lightning strikes are detected within a known distance from a lightning detector during a given time period, a predetermined frequency of lightning strikes is detected, or a combination thereof.

7. The method according to claim 1, wherein the step of sensing the ambient weather condition comprises the steps of sensing an actual wind speed with an anemometer; and sensing the occurrence of a lightning strike with a lightning detector.

8. The method according to claim 7, wherein the control unit determines that the storm condition exists when:

the actual wind speed is greater than or equal to a low threshold wind speed and less than or equal to a high threshold wind speed; a predetermined number of lightning strikes are detected; or both.

9. The method according to claim 8, wherein the predetermined number of lightning strikes is greater than:

a threshold number of lightning strikes within a known distance from a lightning detector during a given time period; a predetermined frequency of lightning strikes; or both.

10. The method according to claim 1 further comprising the step of determining the storm condition exists in response to a remotely-entered override signal communicated to the control unit from a remote location over a network.

* * * * *